United States Patent [19]
Kanda

[11] Patent Number: 5,828,703
[45] Date of Patent: Oct. 27, 1998

[54] DATA CARRIER CAPABLE OF INCREASING DATA TRANSMISSION RATE

[75] Inventor: Yoshimi Kanda, Kyoto, Japan

[73] Assignee: Omron Corporation, Kyoto, Japan

[21] Appl. No.: 616,271

[22] Filed: Mar. 15, 1996

[30] Foreign Application Priority Data

Mar. 15, 1995 [JP] Japan .................................... 7-084917

[51] Int. Cl.⁶ .................................................. H04L 27/06
[52] U.S. Cl. ........................................... 375/316; 375/355
[58] Field of Search ..................... 375/316, 257, 375/258, 355, 238; 340/825.54, 825.57, 825.67, 825.63, 825.71

[56] References Cited

U.S. PATENT DOCUMENTS

| | | | |
|---|---|---|---|
| 4,123,625 | 10/1978 | Chow | 375/211 |
| 5,313,198 | 5/1994 | Hirao et al. | 340/825.54 |
| 5,521,590 | 5/1996 | Hanaoka et al. | 340/825.54 |
| 5,652,423 | 7/1997 | Saitoh et al. | 235/492 |

FOREIGN PATENT DOCUMENTS 1-151831   6/1989   Japan .

*Primary Examiner*—Tesfaldet Bocure
*Attorney, Agent, or Firm*—Foley & Lardner

[57] ABSTRACT

A series connection of a rectification diode and a voltage clipping circuit is connected to a resonance circuit. The voltage clipping circuit is a parallel connection of a resistor and a diode. A constant voltage circuit is connected to the voltage clipping circuit. Since no current flows through the voltage clipping circuit during residual resonance, a signal having a ripple component on top of a stabilized DC voltage appears at the input terminal of the voltage clipping circuit. By shaping the signal having the ripple component, a rectangular-wave signal and a clock signal are extracted, based on which signals a demodulation circuit restores transmitted data.

9 Claims, 9 Drawing Sheets

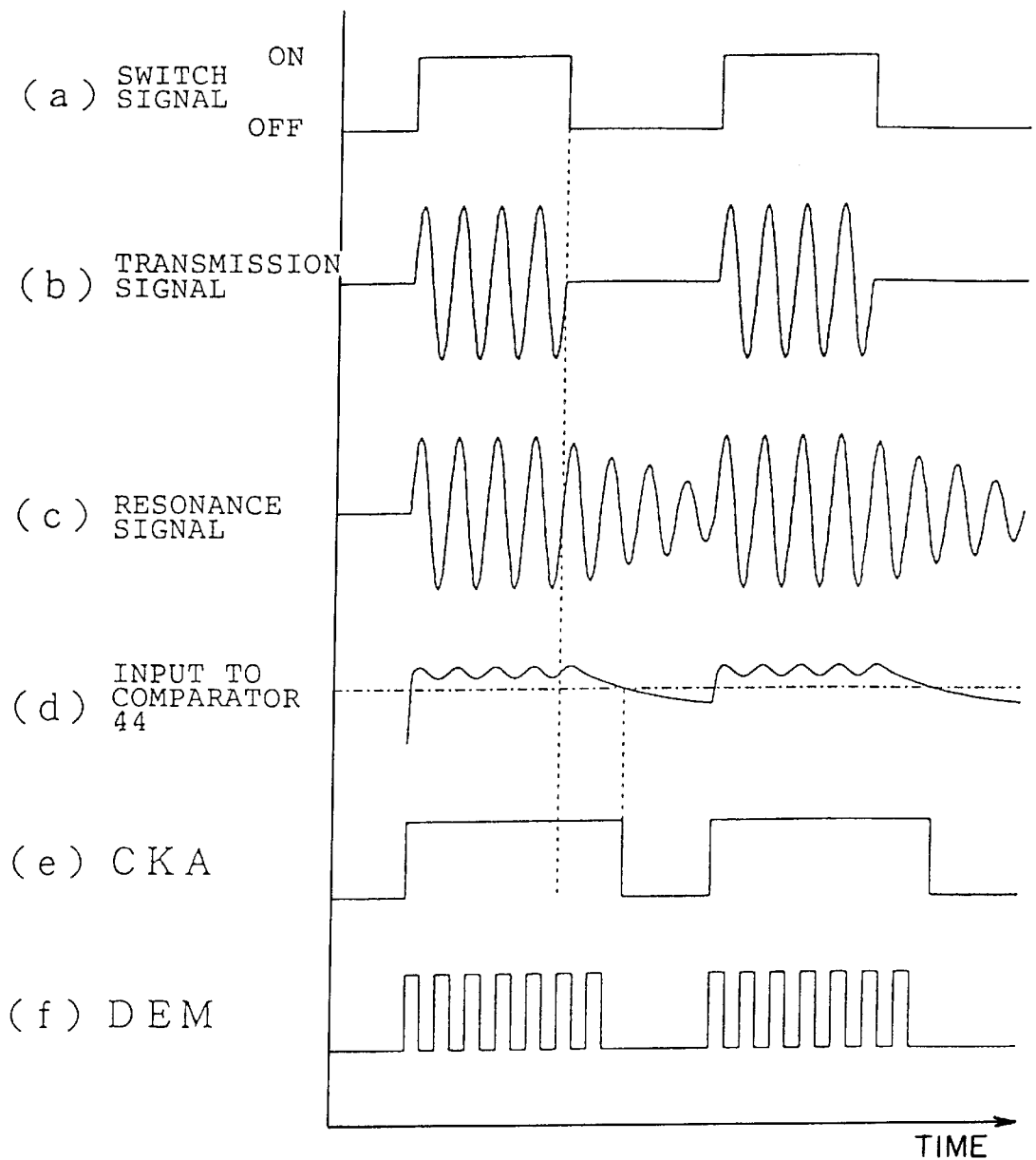

DATA CARRIER CAPABLE OF INCREASING DATA TRANSMISSION RATE

BACKGROUND OF THE INVENTION

1. Field of the Invention

The present invention relates to a data carrier and a demodulation device of a non-contact communication apparatus that is used in a physical distribution system for managing tools or products or is used to discriminate among human bodies, etc.

2. Description of the Related Art

Conventionally, to mechanize, for instance, management of tools of a machine tool, or discrimination among parts and products on an assembling and conveying line in a factory, there is needed a system for discriminating among various types of articles, such as tools, parts, and products and thereby managing those articles. For this purpose, there has been proposed a non-contact communication apparatus in which an object to be discriminated is provided with a memory unit (data carrier) having a memory, necessary information is externally written to the memory in advance by data transmission, and the stored information is read out when necessary (see Japanese Unexamined Patent Publication No. Hei. 1-151831).

As shown in FIG. 7, the above non-contact communication apparatus includes a read/write control unit consisting of an ID controller 1 and a read/write head 2, and a data carrier 3. Signals are transmitted from the read/write head 2 to the data carrier 3 while intermittent oscillations of a constant frequency and different duty cycles are effected in the read/write head 2. In data reception from the data carrier 3, the read/write head 2 sends a signal of a given frequency. In this operation, a resonance circuit in the data carrier 3 controls residual resonance. The read/write head 2 receives a signal by judging existence/non-existence of such residual resonance by means of a resonance circuit incorporated therein.

As shown in FIG. 7, the read/write control unit has the ID controller 1 and the read/write head 2. The ID controller 1 has a transmission control circuit 11, a reference clock generation circuit 12, and a reception control circuit 13. In data transmission from the read/write head 2 to the data carrier 3, the transmission control circuit 11 generates an intermittent transmission signal of a constant frequency and a first or second duty cycle corresponding to transmission data. In data reception from the data carrier 3, the transmission control circuit 11 generates an intermittent transmission signal having the constant frequency and a given, third duty cycle of 50%, for instance. As shown in FIG. 7, the read/write head 2 is provided with an oscillation circuit 15 and a transmission coil L1 connected to it. The transmission coil L1 is provided on a surface of the read/write head opposed to the data carrier 3. The oscillation circuit 15 oscillates at the constant frequency under the control of the transmission control circuit 11. The read/write head 2 is also provided with a resonance circuit 16 consisting of a reception coil L2 and a capacitor C1. An output of the resonance circuit 16 is demodulated by a demodulation circuit 17, and input to a reception control circuit 13. Like the transmission coil L1, the reception coil L2 is provided on the surface of the read/write head 2 opposed to the data carrier 3.

FIG. 8 is a block diagram showing the configuration of a conventional data carrier 3. As shown in FIG. 8, the data carrier 3 has a resonance circuit 31 consisting of a coil L3 and a capacitor C2 connected to it in parallel. Connected between the two terminals of the resonance circuit 31 are a full-wave rectification circuit 32 and a voltage limiting circuit 33. A smoothing circuit 34 is connected to the rectification circuit 32. The voltage limiting circuit 33 serves to limit the level of a voltage across it to a predetermined value or less, and is a Zener diode, for instance. The smoothing circuit 34 smooths a rectified and level-limited voltage Vcc, and supplies a resulting voltage to respective parts of the data carrier 3.

A DEM extraction circuit 35 is connected to one of the two terminals of the resonance circuit 31. The DEM extraction circuit 35 has a passband including the carrier frequency, and shapes a carrier of a transmission signal into a rectangular-wave signal by half-wave rectification. An output of the DEM extraction circuit 35 is input to a demodulation circuit 36. An integration comparator circuit 37 is also connected to the resonance circuit 31. The integration comparator circuit 37 extracts a clock signal CKA by envelope-detecting an output signal of the resonance circuit 31 and comparing a resulting signal with a threshold that is produced by dividing a supply voltage. The extracted CKA signal is supplied to the demodulation circuit 36. When the data carrier 3 receives a signal, the demodulation circuit 36 counts, by using the clock signal CKA, carrier pulses that are extracted by the DEM extraction circuit 35, and judges whether the signal is of a H level or a L level based on a duty cycle of intermittent transmission. The signal thus demodulated is separated into a command and data by a memory control section 38, and necessary data is written to a memory 39. Data is also read out from the memory 39. The output of the integration comparator circuit 37 is also supplied to a fall pulse generation circuit 40, which generates a short pulse at every fall of the clock signal CKA produced by the integration comparator circuit 37. The output of the fall pulse generation circuit 40 is supplied to a shunt pulse generation circuit 41. A NRZ signal read out by the memory control section 38 is converted by a conversion circuit 42 into, for instance, serial biphase codes, which are input to a shunt pulse generation circuit 41. The shunt pulse generation circuit 41 generates a shunt pulse by ANDing the outputs of the fall pulse generation circuit 40 and the conversion circuit 42, and a resulting signal is input to a shunt circuit 43. The shunt circuit 43 has a pair of switching elements for grounding the two terminals of the resonance circuit 31 in response to the shunt pulse. By grounding the two terminals of the resonance circuit 31 at the same time, the shunt circuit 43 stops residual resonance in short time. The circuit block from the fall pulse generation circuit 40 to the shunt circuit 43 constitutes a residual resonance control means.

The integration comparator circuit 37 includes diodes D1 and D2 whose anodes are connected to the respective terminals of the resonance circuit 31 and whose cathodes are connected to each other, a capacitor C3 for smoothing an output of the diodes D1 and D2, and a load resistor R1. An output voltage of the load resistor R1 is input to one terminal of a comparator 44. The other terminal of the comparator 44 is supplied with a reference voltage that is produced by dividing the supply voltage Vcc by resistors R2 and R3. Based on the reference voltage, the comparator 44 shapes the rectified voltage to extract the clock signal CKA.

Next, a description will be made of waveforms at several points in the read/write head 2 and the data carrier 3. Parts (a)–(f) of FIG. 9 show waveforms at points a–f in FIGS 7, 8 and 9. Part (a) shows a switch signal in the read/write head 2, and part (b) shows the waveform of a transmission signal that is transmitted from the read/write head 2, in which the transmission signal has a 50% duty cycle when data should be received from the data carrier 3. Upon reception of the transmission signal by the data carrier 3, a resonance signal with residual resonance having a waveform as shown in part (c) is obtained at the resonance circuit 31. The resonance signal is integrated by the integration circuit of the integration comparator circuit 37, to assume a waveform as shown in part (d). The comparator 44 converts this signal into a rectangular-wave signal as shown in part (e) by comparing it with the given threshold. Therefore, pulses that are output from the DEM extraction circuit 35 are selected by using the thus-obtained rectangular-wave signal, and a signal as shown in part (f) is output from the demodulation circuit 36.

However, in the conventional data carrier 3, as seen from parts (a) and (e) of FIG. 9, the fall of the clock signal CKA is delayed from that of the switch signal in the read/write head 2. The demodulation circuit 36 judges whether a transmission signal from the read/write head 2 represents 0 or 1, or is a reception mode signal by counting pulses that are obtained by using the clock signal CKA. To transmit data at high speed, the number of pulses decreases inevitably. In this case, the demodulation circuit 36 may count pulses erroneously due to the above-mentioned delay of a fall, possibly causing erroneous data recognition.

In another conventional data carrier, a half-wave rectification circuit is used in place of the full-wave rectification circuit 32, and a circuit consisting only of the diode D1 and a capacitor is used to envelope-detect a signal produced by the coil portion. Also in this case, there is a possibility that a delay of the fall of an envelope signal causes an erroneous operation. As a result, the clock signal CKA may not have a correct duty cycle, and a transmission signal from the read/write head 2 may not be recognized, that is, communication may not be performed correctly.

Although the delay time of a fall can be reduced by decreasing the integration time constant by making the capacitance of the capacitor C3 smaller, in this case a variation in the carrier signal may cause a split in the waveform. Therefore, the time constant cannot be made smaller than a certain limit.

SUMMARY OF THE INVENTION

The present invention has been made in view of the above problems in the art, and has an object of correctly reproducing data and a clock signal to enable correct communication even when the number of pulses is reduced to increase the data transmission rate.

According to a first aspect of the invention, there is provided a data carrier which receives a transmitted signal in the form of intermittent carrier signals having duty cycles that are varied in accordance with transmission data, said data carrier comprising:

a resonance circuit including a coil, for receiving the transmitted signal;

a rectification circuit connected to the resonance circuit;

a voltage clipping circuit connected to an output terminal of the rectification circuit, and including a resistor and a voltage clipping element that are connected to each other in parallel;

a constant voltage circuit connected to an output terminal of the voltage clipping circuit, for producing a stabilized voltage for use in the data carrier;

a demodulation circuit section for restoring data and a clock signal by extracting a ripple component that is obtained at an input terminal of the voltage clipping circuit;

a memory;

a memory control section for storing the data into the memory by using the clock signal; and a residual resonance control section for control residual resonance in the resonance circuit based on the data that is read out from the memory by the memory control section.

According to the first aspect of the invention, there is also provided a demodulation device comprising:

a pulse shaping circuit for shaping an input signal including a supply voltage and a ripple component superimposed thereon;

a clock extraction circuit for extracting a clock signal based on an output signal of the pulse shaping circuit and an end thereof; and a demodulation circuit for demodulating a transmitted signal based on the output signal of the pulse shaping circuit and the clock signal.

According to a second aspect of the invention, there is provided a data carrier that receives a transmitted signal in the form of carrier signals in which positive or negative half cycles are suppressed in accordance with transmission data, said data carrier comprising:

a resonance circuit including a coil, for receiving the transmitted signal;

first and second rectification circuits connected to respective terminals of the resonance circuit;

first and second voltage clipping circuits connected to respective output terminals of the first and second rectification circuits, each of the first and second voltage clipping circuits including a resistor and a voltage clipping element that are connected to each other in parallel;

a constant voltage circuit connected to an common output terminal of the first and second voltage clipping circuits, for producing a stabilized voltage for use in the data carrier;

a first pulse shaping circuit for extracting clock pulses by shaping a ripple component that is obtained at an input terminal of the first voltage clipping circuit;

a second pulse shaping circuit for extracting data pulses by shaping a ripple component that is obtained at an input terminal of the second voltage clipping circuit; and a demodulation circuit for demodulating the transmitted signal based on the clock pulses and the data pulses.

In the data carrier according to the first aspect of the invention, a ripple component appears at the input terminal of the voltage clipping circuit only while the data carrier is energized by a read/write head, that is, no ripple component occurs during residual resonance. Therefore, the demodulation circuit section can restore data and a clock signal by extracting the ripple component.

In the data carrier according to the second aspect of the invention, a ripple component on top of a supply voltage produced by the constant voltage circuit is shaped by the first and second pulse shaping circuits. As a result, shaped pulses are always obtained for one of positive and negative half cycles, while for the other half cycles pulses are obtained in accordance with transmitted data. Based on those two kinds of pulses, the demodulation circuit demodulates a transmitted signal.

BRIEF DESCRIPTION OF THE DRAWINGS

FIG. 9 shows waveforms at several points in the conventional non-contact communication apparatus.

DESCRIPTION OF THE PREFERRED EMBODIMENTS

Figure 1:
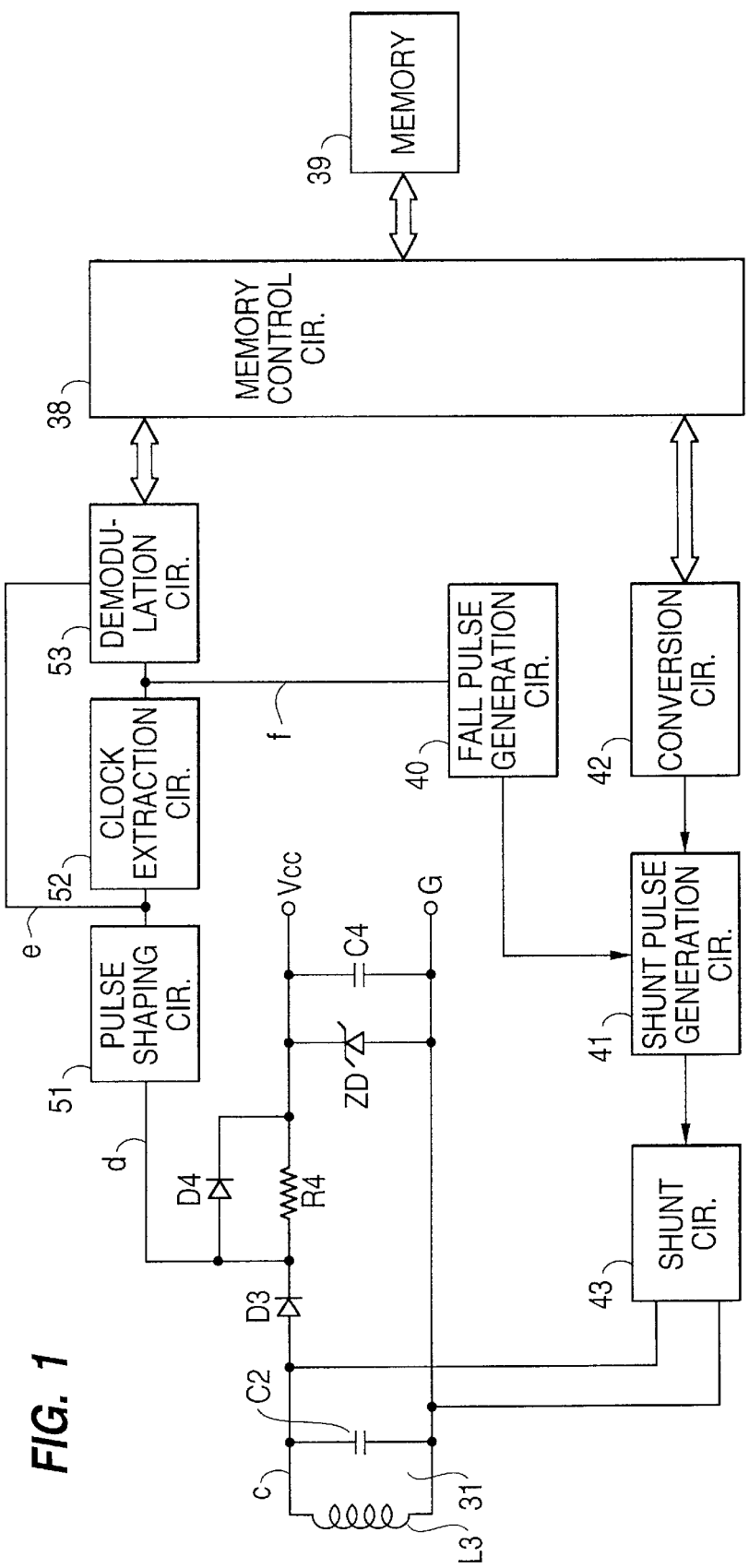
FIG. 1 is a block diagram showing the configuration of a data carrier according to a first embodiment of the present invention.

FIG. 1 is a circuit diagram showing the configuration of a data carrier according to a first embodiment of the present invention. The components shown in FIG. 1 that are the same as those of the above-described conventional data carrier 3 are given the same reference symbols and detailed descriptions therefor will be omitted. In this embodiment, a diode D3 that constitutes a rectification circuit is connected to one of the terminal of the resonance circuit 31, and a parallel connection of a resistor R4 and a diode D4 is connected to the diode D3 in series. The diode D4 is a clipping element for clipping a voltage at its forward voltage drop, for instance, about 0.7 V, and constitutes, together with the resistor R4, a voltage clipping circuit. A Zener diode ZD and a smoothing capacitor C4 that constitute a constant voltage circuit are connected to the other connecting point of the resistor R4 and the diode D4. Connected to the anode of the diode D4 is a pulse shaping circuit 51, which is to shape a ripple component on top of a supply voltage Vcc. An output of the pulse shaping circuit 51 is supplied to a clock extraction circuit 52, which is to produce a clock signal CKA by rectifying the above carrier pulses. The outputs of the pulse shaping circuit 51 and the clock extraction circuit 52 are input to a demodulation circuit 53. The demodulation circuit 53 judges whether a transmission signal from the read/write head represents data of 0 or 1, or is a reception mode signal by counting pulses that exist in the duration of each clock of the clock signal CKA. The remaining configuration is the same as that of the conventional example.

Figure 2:
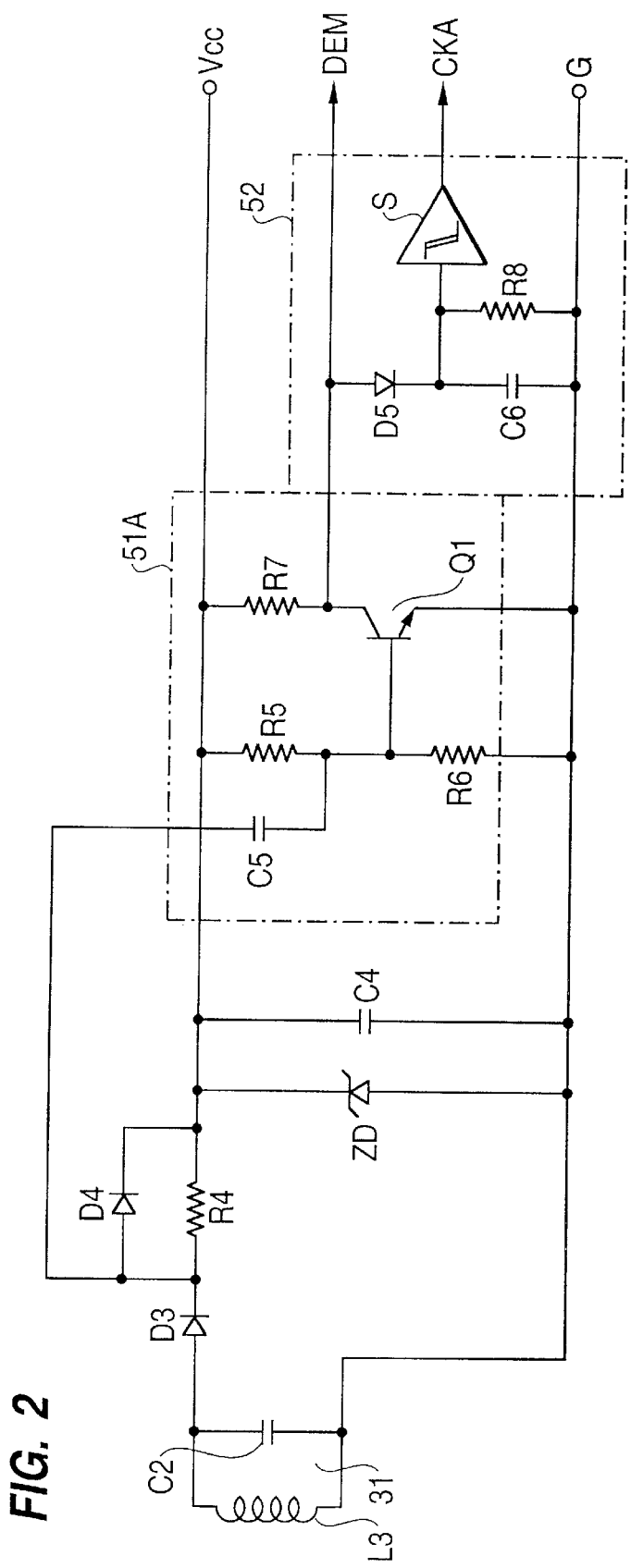
FIG. 2 is a circuit diagram showing a circuit example of part of the data carrier of FIG. 1 including a rectification circuit, a voltage clipping circuit, a pulse shaping circuit, and a clock extraction circuit.

FIG. 2 is a circuit diagram showing part of the data carrier 3A, that is, the resonance circuit 31, the rectification circuit connected thereto, the voltage clipping circuit, the constant voltage circuit, a pulse shaping circuit 51A, and the clock extraction circuit 52. As shown in FIG. 2, a signal including a ripple component on top of the supply voltage Vcc is input, via a capacitor C5, to the connecting point of resistors R5 and R6, which divide the supply voltage Vcc. The capacitor C5 and the base of a switching transistor Q1 are connected to the connecting point of the resistors R5 and R6. The emitter of the transistor Q1 is grounded and its collector is connected to the clock extraction circuit 52. In the clock extraction circuit 52, a series connection of a diode D5 and a capacitor C6 is provided between the input terminal and the ground. A resistor R8 and a Schmitt trigger buffer S are connected to the connecting point of the diode D5 and the capacitor C6. The Schmitt trigger buffer S outputs a clock signal CKA.

Figure 3:
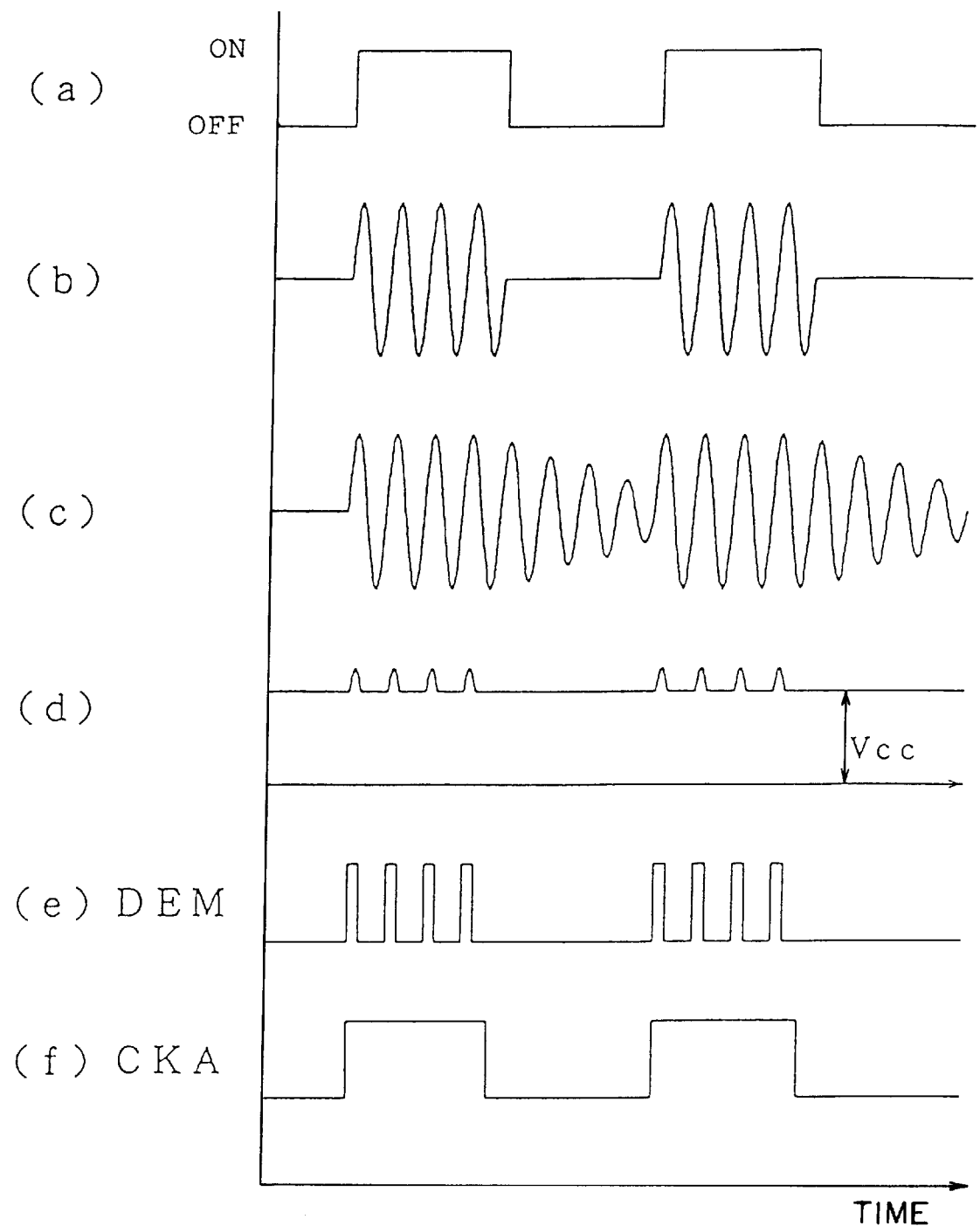
FIG. 3 is a time chart showing the operation of the data carrier of the first embodiment.
Figure 7:
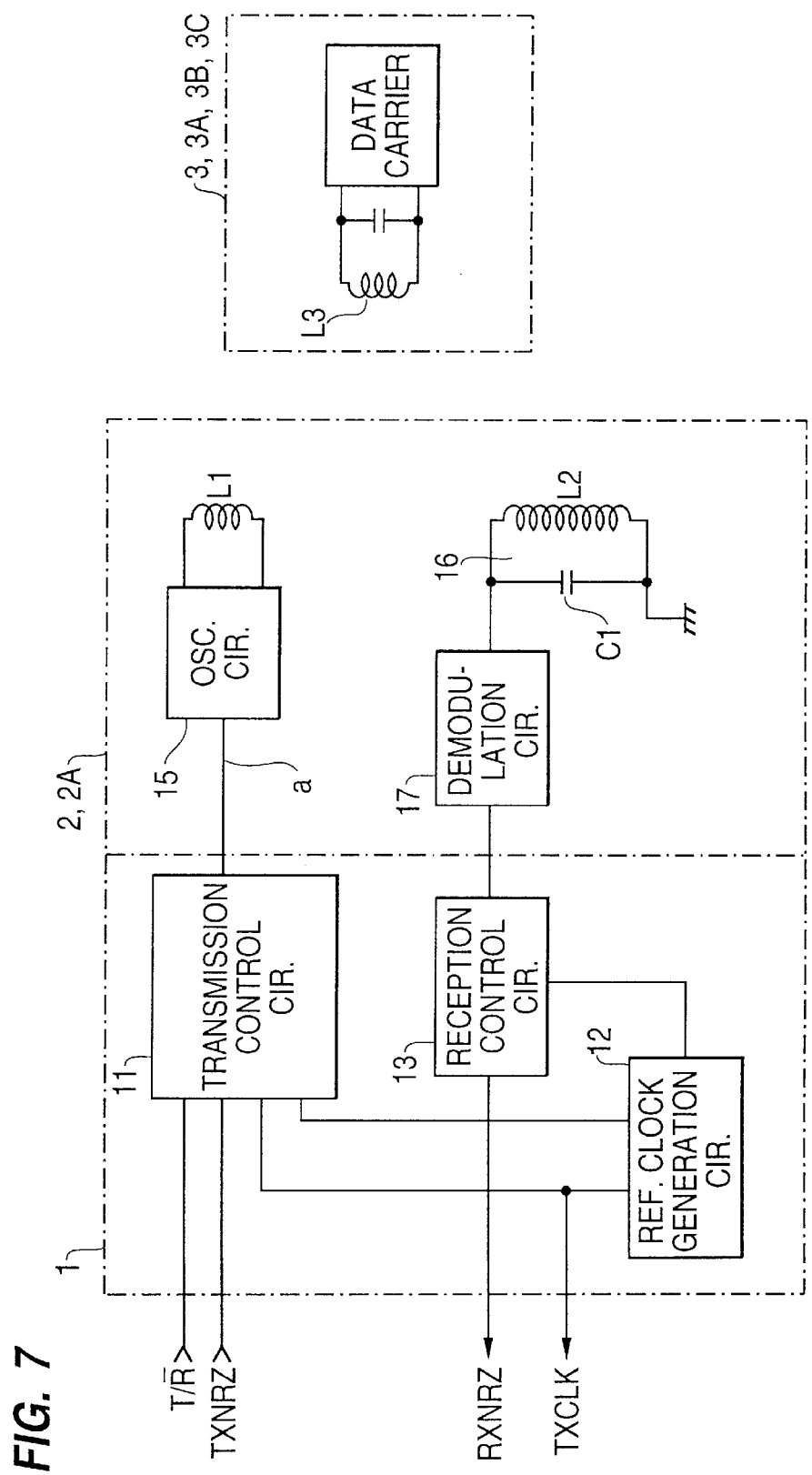
FIG. 7 is a block diagram showing the entire configuration of a non-contact communication apparatus.
Figure 8:
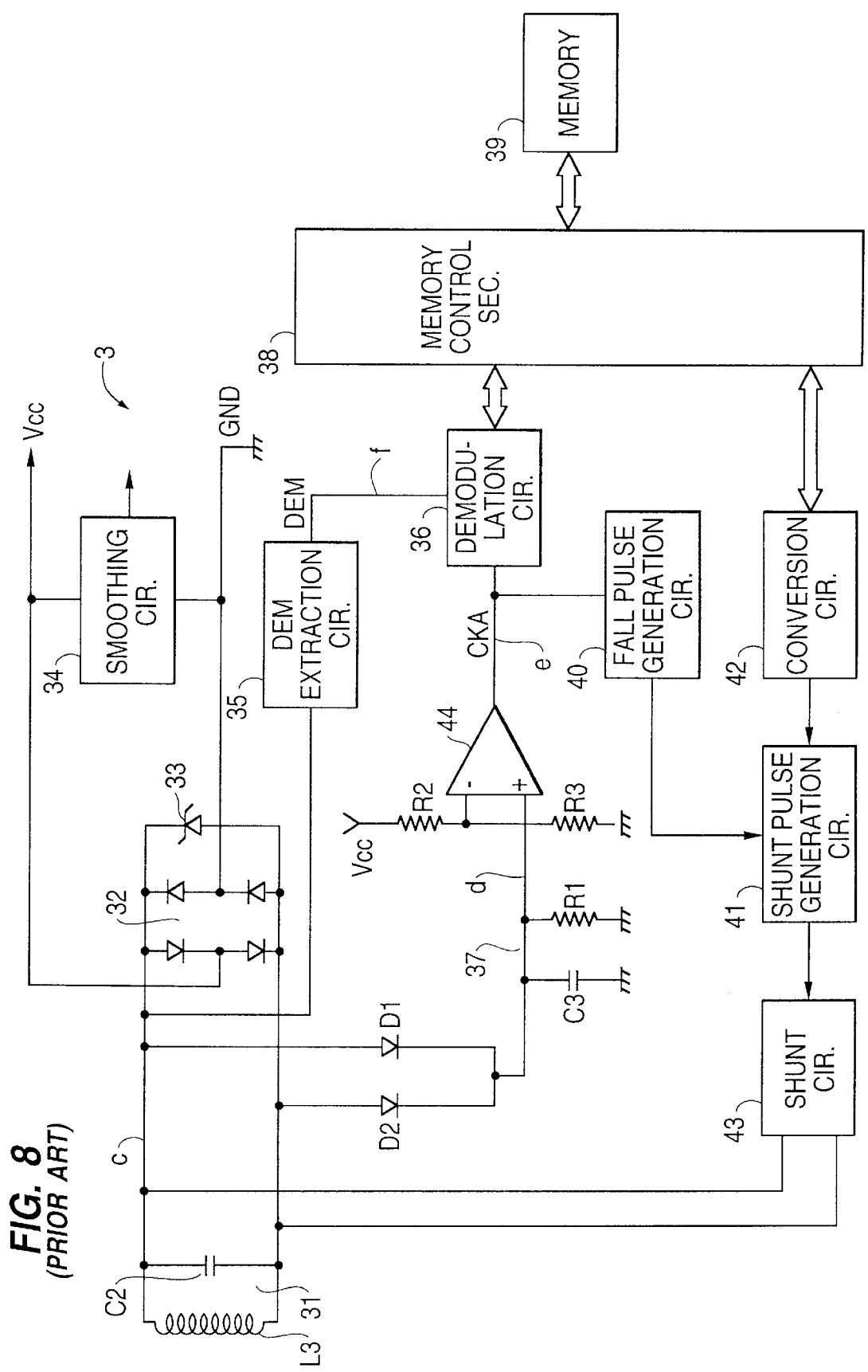
FIG. 8 is a block diagram showing an example of a conventional data carrier.

The operation of this embodiment will be described below with reference to a time chart of FIG. 3. Parts (a)–(f) of FIG. 3 show waveforms at points a–f in the circuits of FIGS. 1 and 7. Part (a) shows a switch signal for controlling the oscillation circuit 15 of the read/write head 2. Driven based on the switch signal, the oscillation circuit 15 generates a transmission signal shown in part (b). If the data carrier 3A is located close to the read/write head 2, a signal shown in part (c) is induced in the resonance circuit 31 and residual resonance occurs even after the end of the oscillation.

In this embodiment, an output of the resonance circuit 31 is supplied to the Zener diode ZD via the rectifying diode D3 and the resistor R4, and its voltage level is limited by the Zener diode ZD. Therefore, the resonance signal of part (c) has peak voltages that are equal to a voltage Vz across the Zener diode ZD plus voltages across the two diodes D3 and D4.

While the coil L1 of the read/write head 2 is energized, in the data carrier 3A a current flows from the resonance circuit 31 to the Zener diode ZD side via the diode D3 and the resistor R4. After transition to residual resonance, a current flows only within the resonance circuit 31, that is, no current flows to the Zener diode ZD side. As a result, as shown in part (d), signal that is a the voltage Vcc plus a ripple component across the diode D4 is obtained at the anode of the diode D4. In the pulse shaping circuit 51A, the signal that is the supply voltage Vcc plus the slight ripple component is coupled to the switching transistor Q1 via the capacitor C5, which produces a rectangular-wave signal shown in part (e). The clock extraction circuit 52 shapes (rectifies) the rectangular-wave signal into a clock signal CKA shown in part (f). Pulses of the signal of part (f) correspond closely to carrier packets of part (b) that are transmitted from the read/write head 2, and fall upon transition to residual resonance. The demodulation circuit 53 restores transmitted data based on the pulse signal DEM and the clock signal CKA.

Figure 4:
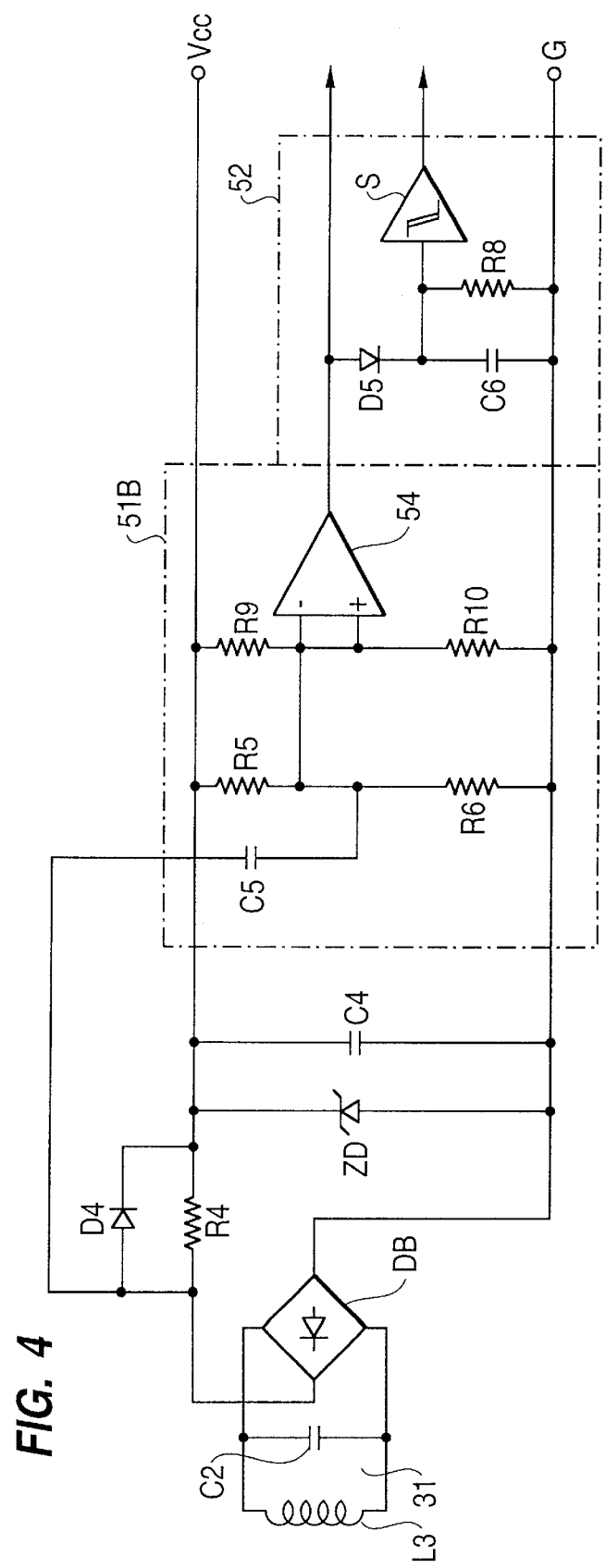
FIG. 4 is a circuit diagram showing a circuit example of part of a data carrier according to a second embodiment of the invention in which the circuit example includes a rectification circuit, a voltage clipping circuit, a pulse shaping circuit, and a clock extraction circuit.

FIG. 4 is a circuit diagram showing the resonance circuit 31 and its peripheral circuits of a data carrier 3B according to a second embodiment of the invention. Since the portion of the data carrier 3B not shown in FIG. 4 is the same as that of FIG. 1, a description therefor will be omitted. In this embodiment, a diode bridge DB is connected to the resonance circuit 31. Therefore, a full-wave-rectified signal of a resonance signal is supplied to the diode D4. Further, in a pulse shaping circuit 51B, a comparator 54 is used instead of the transistor Q1 of FIG. 3. To set a threshold for the comparator 54, voltage dividing resistors R9 and R10 are used. With the above configuration, the data carrier 3B of this embodiment can produce a pulse signal DEM and can extract a clock signal CKA by shaping the pulse signal DEM in the same manner as in the first embodiment.

Figure 5:
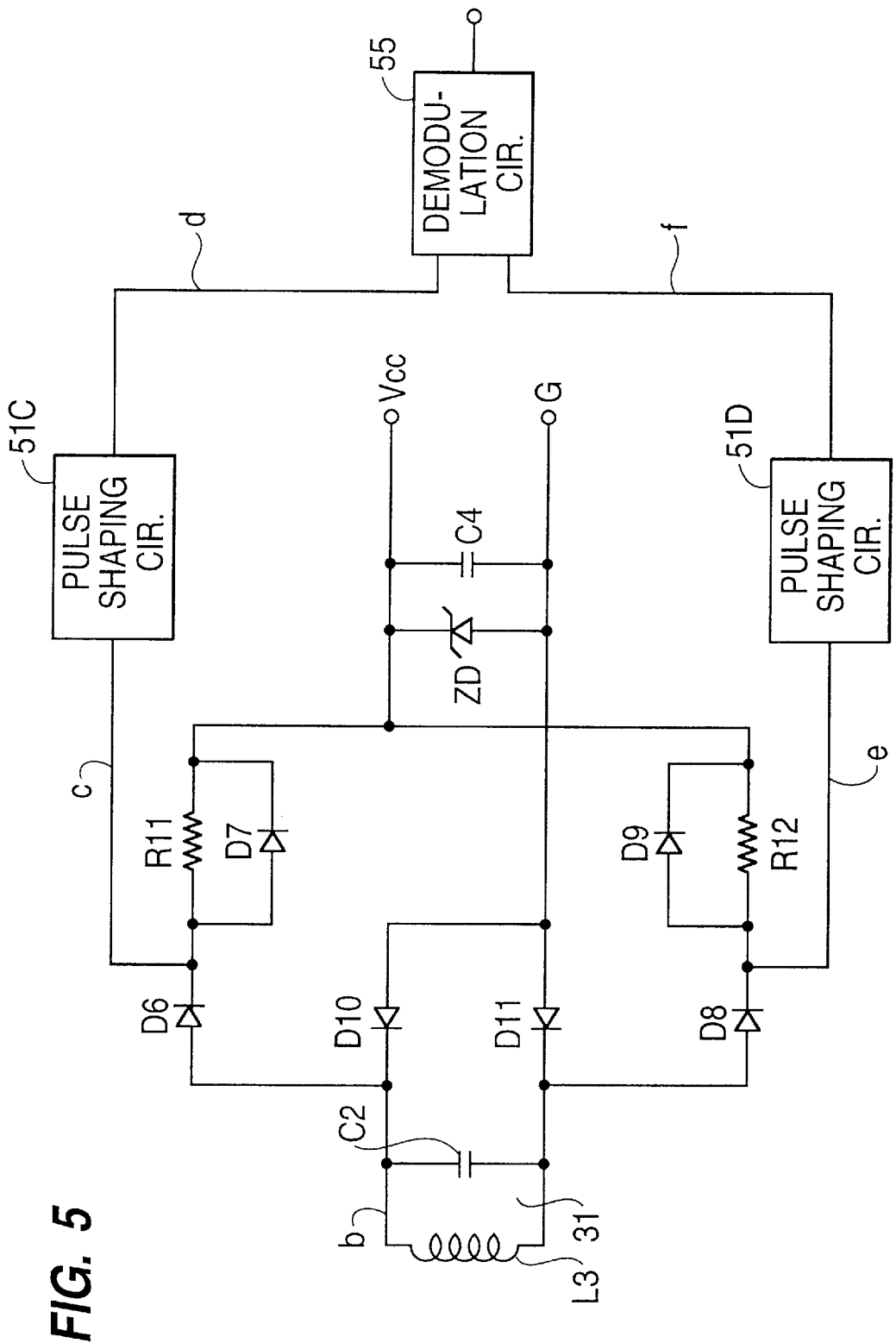
FIG. 5 is a circuit diagram showing a circuit example of the main part of a data carrier according to a third embodiment of the invention.

A third embodiment of the invention will be described below with reference to FIG. 5. In this embodiment, as in the case of the first embodiment, a diode D6 and a parallel connection of a diode D7 and a resistor R11 are connected to one terminal of a resonance circuit 31 of a data carrier 3C. Further, in this embodiment, a diode D8 and a parallel connection of a diode D9 and a resistor R12 are connected to the other terminal of the resonance circuit 31. The two terminals of the resonance circuit 31 are grounded via diodes D10 and D11, respectively. The cathodes of the diodes D7 and D9 are together connected to a Zener diode ZD for limiting a voltage, that is, producing a constant voltage. The cathodes of the diodes D6 and D8 are respectively connected to pulse shaping circuits 51C and 51D, which have the same configuration as the pulse shaping circuit 51A of FIG. 2. Outputs of the pulse shaping circuits 51C and 51D are input to a demodulation circuit 55. The demodulation circuit 55 restores data based on pulse signals sent from the pulse shaping circuits 51C and 51D.

Figure 6:
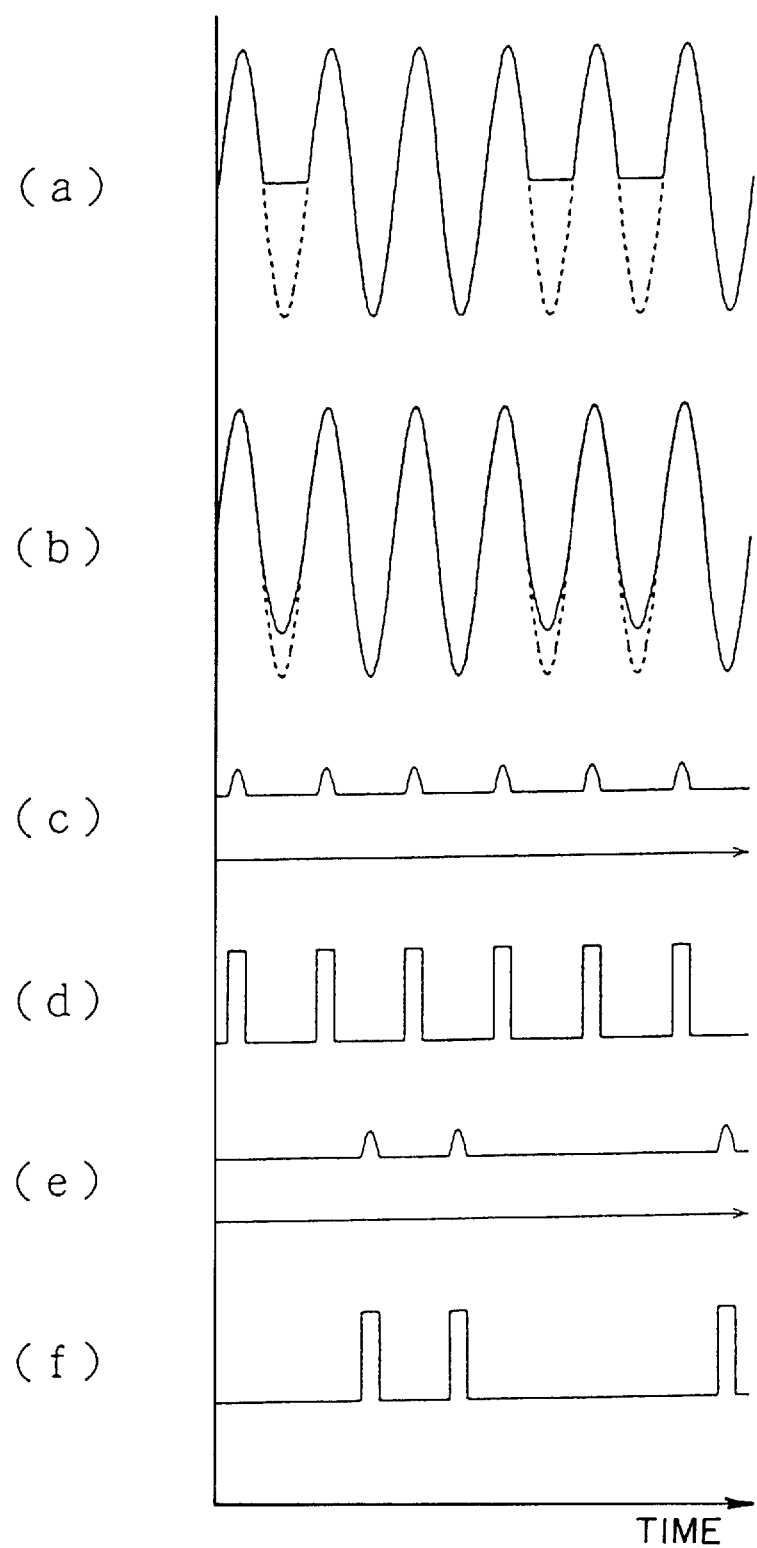
FIG. 6 is a time chart showing the operation of the data carrier of the third embodiment.

The operation of this embodiment will be described with reference to a time chart of FIG. 6. Parts (b)–(f) of FIG. 6 show waveforms at points b–f in the circuit of FIG. 5. Part (a) shows a transmission signal sent from a read/write head 2A. In this embodiment, the read/write head 2A transmits a sine wave signal of a given period, or a modified sine wave signal in which negative half cycles are suppressed intermittently. When the data carrier 3C receives a transmission signal of the latter type, the resonance circuit 31 produces a signal as shown in part (b), in which negative half cycles corresponding to the suppressed portions of the transmission signal are residual vibrations. As shown in parts (c) and (d), the positive half cycles are processed in the same manner as in the first embodiment such that only a ripple component on top of the supply voltage Vcc is extracted by rectification by the diodes D6 and D7 and the resistor R11 and a resulting signal is shaped by the pulse shaping circuit 51C. As for the negative half cycles, no ripples are generated during residual vibrations. Therefore, as shown in part (e), ripples are extracted only when the data carrier 3C receives negative half cycles. By shaping a resulting signal, the pulse shaping circuit 51D produces a signal as shown in part (f). The signal of part (d) is used as a clock signal and the signal of part (e) is used as data pulses. The demodulation circuit 55 restores transmitted data based on the clock signal and the data pulses.

Compared with the case of transmitting data in the form of a varied number of pulses in each energization period by changing the duty cycle, this embodiment can greatly increase the data transmission rate. Further, in the former data transmission scheme with the use of biphase codes, 50% driving is always effected in both of transmission and reception while the read/write head 2 performs driving. In contrast, in this embodiment, 50% driving is effected even if all the negative half cycles are suppressed, that is, energization of 50% to 100% can be performed. This contributes to improvement in the power transmission efficiency.

Although in this embodiment negative half cycles are suppressed in accordance with data to be transmitted from the read/write head 2, it goes without saying that positive half cycles may be suppressed instead.

As described above, according to the first aspect of the invention, even where the number of pulses in each clock is reduced to increase the data transmission rate between the read/write head and the data carrier, transmitted pulses can be restored correctly by converting a current signal flowing through the rectification circuit into a voltage signal. Transmitted data can be restored by extracting a clock signal by using the pulses thus obtained. Thus, the data transmission rate can be increased.

According to the second aspect of the invention, the read/write head sends out a transmission signal in which positive or negative half cycles are suppressed in accordance with transmission data. Clock pulses and data pulses can be extracted separately by shaping respective signals having ripple components on top of a stabilized DC voltage in which the signals correspond to positive and negative half cycles of the transmission signal. Thus, the second aspect of the invention can greatly increase the data transmission rate.

What is claimed is:

1. A data carrier which receives a transmitted signal in the form of intermittent carrier signals having duty cycles that are varied in accordance with transmission data, said data carrier comprising:

a resonance circuit including a coil, for receiving the transmitted signal;

a rectification circuit connected to the resonance circuit;

a voltage clipping circuit connected to an output terminal of the rectification circuit, and including a resistor and a voltage clipping element that are connected to each other in parallel;

a constant voltage circuit connected to an output terminal of the voltage clipping circuit, for producing a stabilized voltage for use in the data carrier;

a demodulation circuit section for restoring data and a clock signal by extracting a ripple component that is obtained at an input terminal of the voltage clipping circuit;

a memory;

a memory control section for storing the data into the memory by using the clock signal; and a residual resonance control section for control residual resonance in the resonance circuit based on the data that is read out from the memory by the memory control section.

2. A demodulation device comprising:

an input circuit coupled to receive a reference voltage and an input signal, the input circuit configured to provide an output signal in which the input signal is rectified to a constant voltage corresponding to the reference voltage when a voltage level of the input signal is above the reference voltage, and in which the input signal is not rectified when the voltage level of the input signal is below the reference voltage;

a pulse shaping circuit configured to receive the output signal of the input circuit and to shape the output signal so as to output a shaped signal as a result thereof;

a clock extraction circuit configured to extract a clock signal based on the shaped signal output by the pulse shaping circuit; and a demodulation circuit configured to demodulate a transmitted signal based on the shaped signal and the clock signal.

3. The demodulation device according to claim 2, wherein the shaped signal output by the pulse shaping circuit is a rectangular-wave signal.

4. The demodulation device according to claim 2, wherein the transmitted signal is in the form of intermittent carrier signals having duty cycles that are varied in accordance with transmission data.

5. The demodulation device according to claim 2, wherein the input circuit includes a zener diode and a capacitor connected in parallel, the zener diode and the capacitor connected between the reference voltage and a second voltage, wherein the reference voltage is a voltage greater than the second voltage.

6. The demodulation device according to claim 5, wherein the second voltage is a ground voltage.

7. The demodulation device according to claim 5, wherein the input circuit further includes a diode and a resistor connected in parallel, wherein the diode and the resistor are connected at one end to the one end of the zener diode and the capacitor.

8. The demodulation device according to claim 7, wherein the input circuit further includes a second diode connected to another end of the diode and the resistor, wherein a cathode of the diode is connected to the pulse shaping circuit.

9. A data carrier that receives a transmitted signal in the form of carrier signals in which positive or negative half cycles are suppressed in accordance with transmission data, said data carrier comprising:

a resonance circuit including a coil, for receiving the transmitted signal;

first and second rectification circuits connected to respective terminals of the resonance circuit;

first and second voltage clipping circuits connected to respective output terminals of the first and second rectification circuits, each of the first and second voltage clipping circuits including a resistor and a voltage clipping element that are connected to each other in parallel;

a constant voltage circuit connected to a common output terminal of the first and second voltage clipping circuits, for producing a stabilized voltage for use in the data carrier;

a first pulse shaping circuit for extracting clock pulses by shaping a ripple component that is obtained at an input terminal of the first voltage clipping circuit;

a second pulse shaping circuit for extracting data pulses by shaping a ripple component that is obtained at an input terminal of the second voltage clipping circuit; and a demodulation circuit for demodulating the transmitted signal based on the clock pulses and the data pulses.

* * * * *